United States Patent
Grossert et al.

(10) Patent No.: US 6,974,154 B2
(45) Date of Patent: Dec. 13, 2005

(54) STRAP FOR SECURING A SIDE AIRBAG

(75) Inventors: Daniela Grossert, Dresden (DE); Udo Bönsch, Mühltal (DE); Daniel Zink, Glashütten (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 296 days.

(21) Appl. No.: 10/648,306

(22) Filed: Aug. 27, 2003

(65) Prior Publication Data

US 2004/0201206 A1   Oct. 14, 2004

(30) Foreign Application Priority Data

Apr. 9, 2003 (DE) ................. 103 16 221

(51) Int. Cl.[7] ............ B60R 21/16; B60R 21/22
(52) U.S. Cl. ............. 280/743.2; 280/730.2; 280/728.2
(58) Field of Search ............. 280/743.2, 730.2, 280/728.2

(56) References Cited

U.S. PATENT DOCUMENTS

| | | | | |
|---|---|---|---|---|
| 5,249,825 A | * | 10/1993 | Gordon et al. | 280/728.1 |
| 5,609,363 A | * | 3/1997 | Finelli | 280/743.2 |
| 6,412,810 B1 | * | 7/2002 | Wipasuramonton et al. | 280/730.2 |
| 6,557,892 B2 | * | 5/2003 | Herzog | 280/743.2 |
| 6,648,368 B2 | * | 11/2003 | Smith et al. | 280/730.2 |
| 6,709,010 B2 | * | 3/2004 | Dominissini et al. | 280/730.2 |
| 2002/0158450 A1 | | 10/2002 | Hoeft et al. | |

FOREIGN PATENT DOCUMENTS

| | | | |
|---|---|---|---|
| DE | 2364982 | | 12/1973 |
| EP | 0771694 | * | 5/1997 |
| JP | 11-170944 | * | 6/1999 |
| JP | 11-278185 | * | 10/1999 |
| JP | 2003-146175 | * | 5/2003 |
| WO | WO 00/76813 A1 | | 12/2000 |

* cited by examiner

Primary Examiner—Paul N. Dickson
Assistant Examiner—George D. Spisich
(74) Attorney, Agent, or Firm—Lonnie Drayer

(57) ABSTRACT

A side airbag has at least one strap, which can be connected at its first end via a fastening portion to the airbag and at its second end to a vehicle part. The fastening portion of the strap and a second portion adjoining it each have constant cross-sections and a tapered portion is constructed between them. The cross-sectional width of the fastening portion is larger than the cross-sectional width of the second portion and the tapered portion forms a transition between them. The strap is constructed from a constant number of individual fibers extending substantially along the longitudinal axis of the strap.

8 Claims, 3 Drawing Sheets

STRAP FOR SECURING A SIDE AIRBAG

FIELD OF THE INVENTION

The present invention relates to a strap for securing a side airbag.

BACKGROUND OF THE INVENTION

Fixing devices in the form of straps, preferably fastened to side airbags, are known. WO 00/76813 A1, for example, teaches a side airbag which is connected to the frame of a vehicle by straps. The straps are connected to the airbag on the side of the airbag opposite the inside roof lining to hold the airbag in position in the deployed state. In a non-deployed state the airbag the straps are located along the frame or the A and C pillars under the interior covering. During deployment of the side airbag the straps are pulled out of the covering, this being typically through narrow gaps or slots overlapped or covered by part of the door seal.

The problem here is that depending on the material, the geometry of the parts, the surface and the corresponding friction it is difficult to bring the straps into the correct position or to pull them out completely, whereby the protective effect of the side airbag can be impaired. There is in particular a high risk of the straps fouling during the deployment process and the airbag thus not being able to be brought into an optimal position.

SUMMARY OF THE INVENTION

A strap for securing a side airbag according to the present invention, has the strap being connectable at a first end of the strap via a fastening portion of the strap to an airbag and at a second end of the strap via a second portion of the strap to a vehicle part, wherein the fastening portion and the second portion each have constant cross-sections and a tapered portion of the strap is located therebetween, the cross-sectional width of the fastening portion being larger than the cross-sectional width of the second portion and the tapered portion providing a transition therebetween, the strap being constructed from a constant number of individual fibers extending substantially parallel to a longitudinal axis of the strap.

Further features and advantages of the present invention emerge from the following description, in the form of an example, of preferred embodiments of the present invention, this being in relation to the attached drawings.

DETAILED DESCRIPTION OF THE INVENTION

Figure 1:
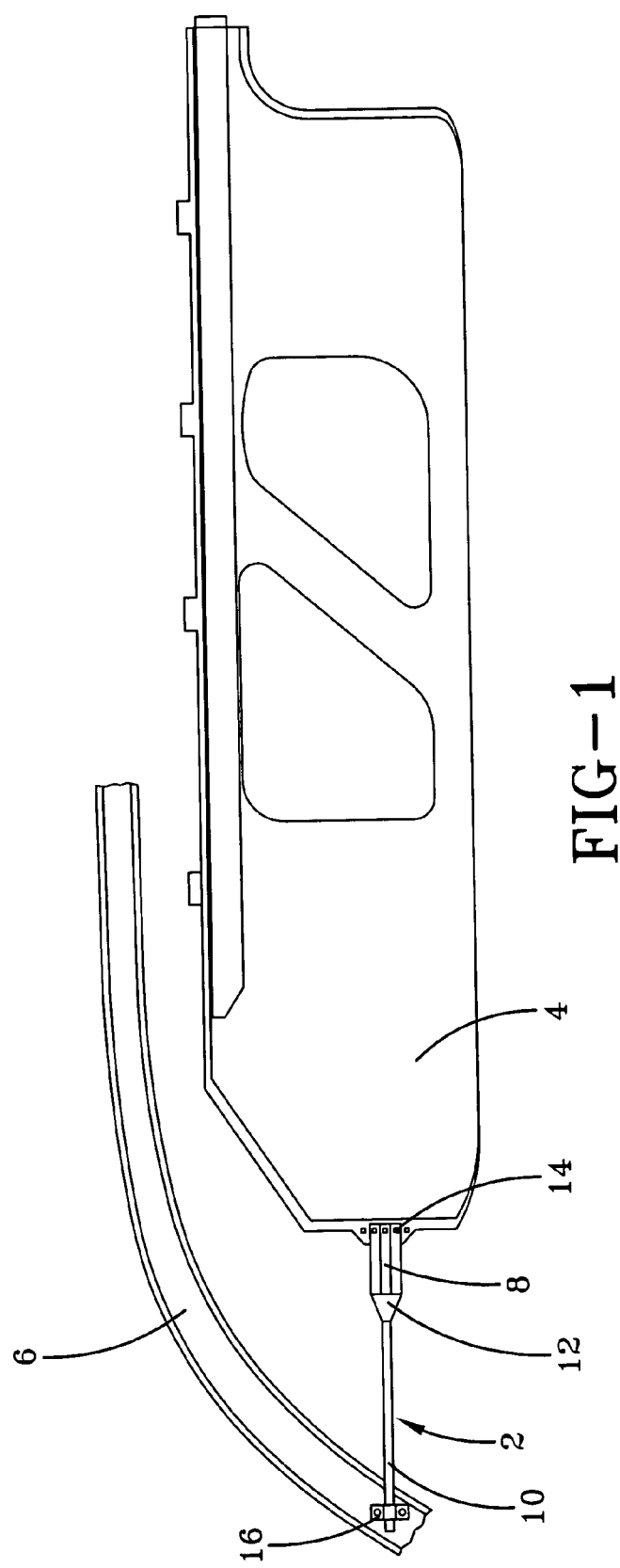
FIG. 1 is a side view of an airbag module with a first embodiment of the strap.

The arrangement shown in FIG. 1 comprises a strap 2 and an airbag 4, which are connected to a frame part or vehicle part 6. The strap 2 has a fastening portion 8, a second portion 10 and a tapered portion 12 arranged between the fastening portion and the second portion. In the tapered portion, the cross-section of the strap is brought into a form that has a low tendency to foul with constant tensile strength. In the region of the tapered portion, the manufacturing technique or weaving technique for the strap is herein transposed in such a way that, from a solid cross-section of the fastening portion which is consequently constructed substantially as single-layered, a hollow cross-section is formed. The hollow cross-section can herein advantageously be constructed as tube-shaped and consist of one layer. However, it would be conceivable also to configure this region as multi-layered by using different materials, to increase the strength. The fastening portion and the second portion herein have cross-sections which remain constant or run constantly along their length, wherein the tapered portion connecting the fastening portion and second portion has a variable or changeable cross-section, in order to achieve matching of the cross-section of the fastening portion to the cross-section of the second portion.

The fastening portion 8 of the strap is connected by a seam 14 to a part of the airbag 4, preferably to its lower region or its region facing away from the inside roof lining of the vehicle. This connection can take place, for example, in the form of bonding or by sewing. A certain minimum bearing or contact face is herein necessary for a secure connection. The width resulting from this does not, however, extend over the entire length of the strap according to the invention (as otherwise there would be a danger of fouling), but only in the region of contact with the airbag. The free end of the second portion 10 is connected to the vehicle part 6 by a clip or a crimp 16.

Advantageously, the second portion 10 has a substantially circular cross-section and the fastening portion 8 a substantially rectangular cross-section. This allows the width direction in the fastening portion to be considerably increased in relation to the circular cross-section, owing to the constant number of fibers or the cross-section face remaining constant, in order to achieve the required connection to the airbag, as the force transmission onto the airbag takes place via the necessarily larger contact face. Because of the circular cross-section in the region of the second portion, fouling during filling or releasing of the airbag is avoided in a particularly advantageous manner. Moreover, a portion with a circular cross-section can be pulled out of the covering of the inside roof lining more easily and with less friction. However, it would also be conceivable to construct the fastening portion and the second portion in such a way that they have a substantially circular cross-section.

Figure 2:
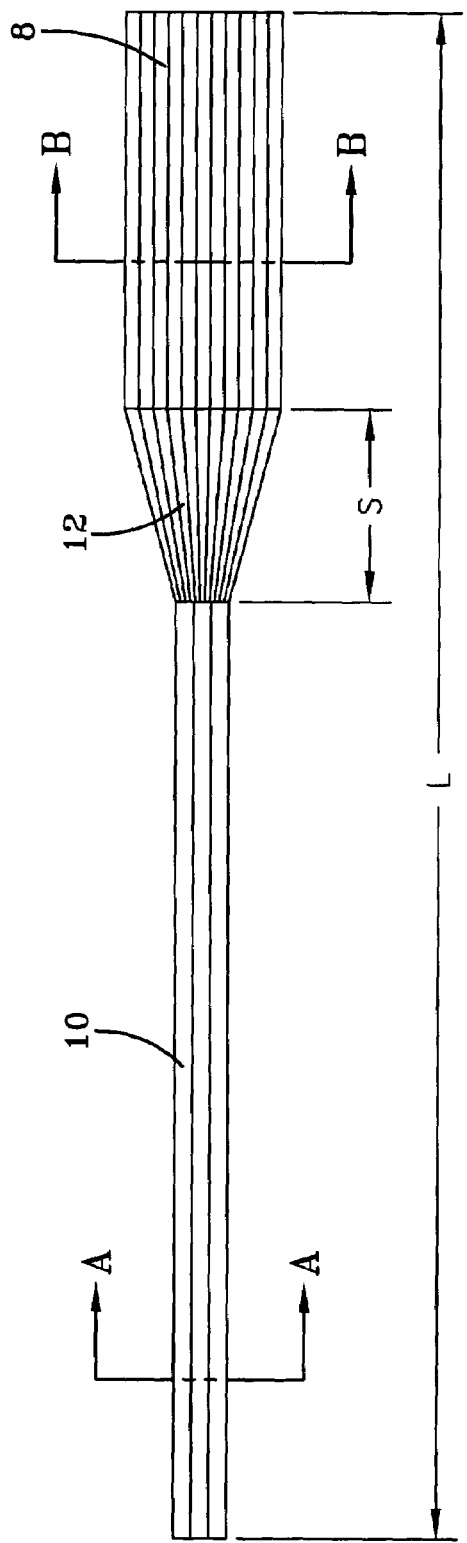
FIG. 2 is a diagrammatic side view of the first embodiment of the strap according to FIG. 1, with only a few of the fibers in the long second portion of the strap shown for clarity.

As shown in FIG. 2 the tapered portion 12 preferably has a length s of between 3 and 20 mm. The length s of the tapered portion depends on the change in the cross-section of the fastening portion 8 to the second portion 10 or on their change in the width direction. The tapered portion 12 is preferably located as close as possible to the connection of the fastening portion 8 of the strap to the airbag 4, i.e. as close as possible to the seam 14. A strap 2 of this kind can have, for example in the fastening portion 8, a cross-sectional width of 20 mm, which when it reaches the second portion 10 tapers to a cross-sectional width of about 3 to about 4 mm. In addition, a ratio L/s of the entire length L of the strap to the length s of the tapered portion is between about 20:1 and about 1000:1, preferably between about 30:1 and about 400:1. Because the transition region or tapered portion is relatively short in relation to the overall length of the strap, advantageously simple manufacture of the strap can be guaranteed. Operational safety is also increased, as the region of the tapered portion, which normally has a tendency to foul, is kept short.

Figure 3B:
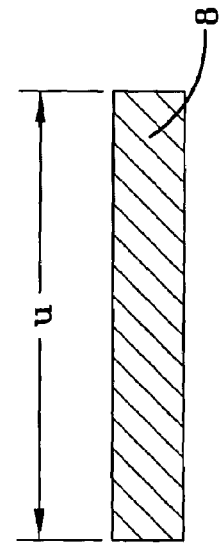
FIG. 3B is a diagrammatic cross-sectional view of the strap according to the first embodiment along section line B—B of FIG. 2.
Figure 3A:
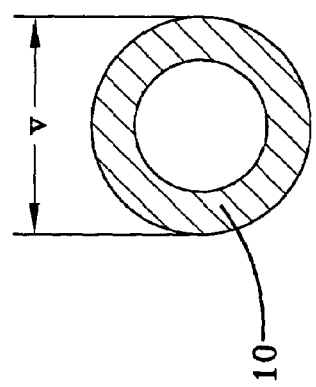
FIG. 3A is a diagrammatic cross-section of the strap according to the first embodiment along section line A—A of FIG. 2.

As shown in FIG. 3A, the cross-section of the second portion 10 of the strap is substantially hollow and circular. By means of the tapered portion 12, this cross-section is converted into a substantially rectangular cross-section in the region of the fastening portion 8, as shown in FIG. 3B. Thus, for the fastening portion, a considerably larger cross-sectional width u emerges in relation to the cross-sectional width v of the second portion 10 of the strap shown in FIG. 3A. This makes possible a larger contact face in the region of the fastening portion 8 with the airbag 4, whereby a better distribution of the force acting on the seam 14 is achieved.

Figure 4:
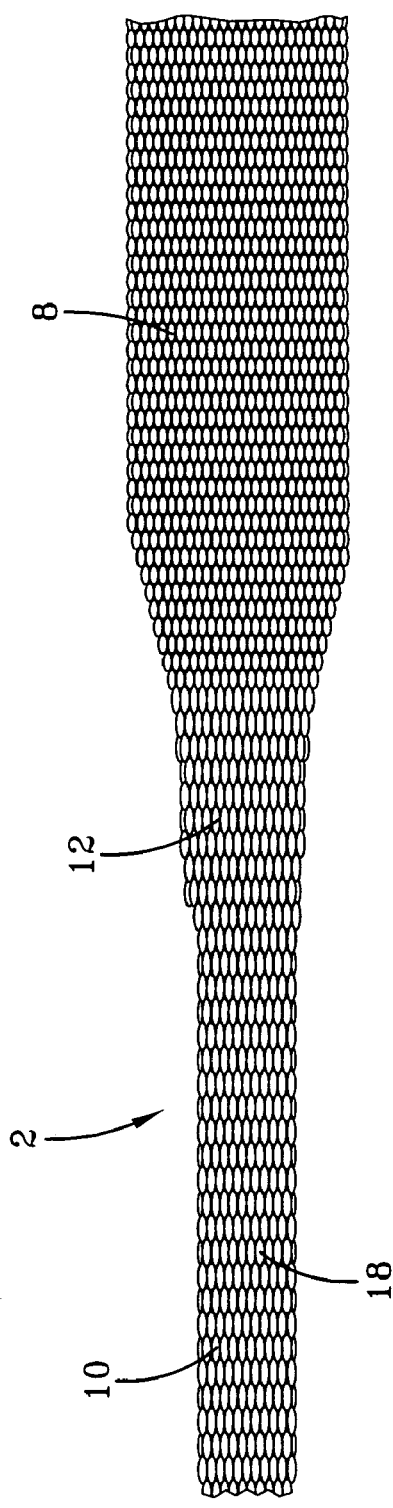
FIG. 4 is a side view of the strap according to the first embodiment, with only a few of the fibers in the long second portion of the strap shown for clarity.

FIG. 4 is a pictorial view of the strap 2, having the second portion 10, the tapered portion 12 and the fastening portion 8. Particularly clearly seen is the change in the weaving technique from the second portion 10 to the fastening portion 8. A strap according to the invention herein has a constant number of individual fibers 18 extending substantially parallel to the longitudinal axis of the strap. The strap is herein advantageously constructed from a multiplicity of fibers in order to construct the strap substantially similarly to a cord or rope. Nylon or other textiles that have adequate strength or can withstand adequate tension can advantageously be used as material for this. Moreover, the strap can be flexible, so it can advantageously be simply fastened or arranged on the frame or under the covering of the inside roof lining of a vehicle. The face of the cross-section, however, remains constant over the entire length of the strap, because the strap is constructed from a constant number of individual fibers extending substantially along the longitudinal axis of the strap, i.e. no further fibers are worked in to achieve widening of the cross-section. Thus a change in cross-section of the strap is achieved substantially only by changing the weaving or knotting technique. This advantageously leads to a strength of the strap that remains constant over its entire length.

Figure 5:
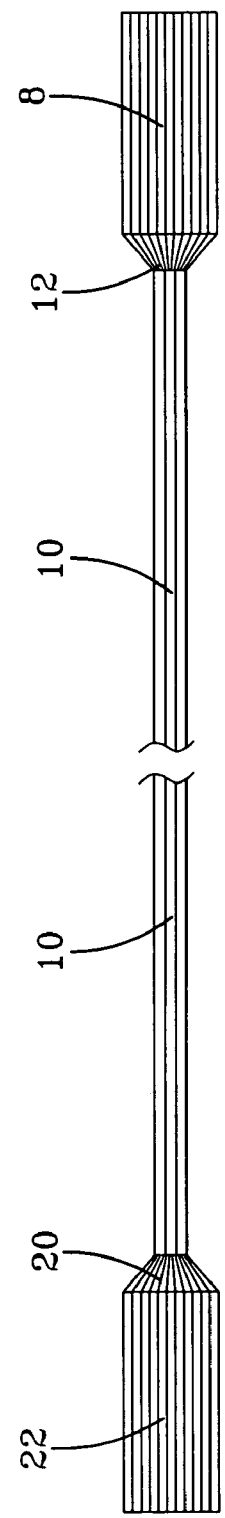
FIG. 5 is a diagrammatic side view of the strap according to a second embodiment, with only a few of the fibers in the long second portion of the strap shown for clarity.

In FIG. 5 a second embodiment of the strap is shown. As also in the first embodiment, the strap has a fastening portion 8, a tapered portion 12 and a second portion 10. However, adjoining the second portion 10 is a second tapered portion 20, which connects a second fastening portion 22 to the second portion 10. The second fastening portion 22 thus offers an enlarged width direction or extension of the cross-section in a direction transverse to the longitudinal axis, whereby a larger support face for fastening to the vehicle part 6 is provided. This leads to an improved distribution of force from the strap 2 onto the vehicle part 6. As a further preference, the second fastening portion has a solid cross-section. The second fastening portion 22 preferably has a substantially rectangular cross-section.

The second tapered portion 20 is herein constructed substantially identically to the first tapered portion 12, wherein the change in its width direction does not have to be identical to that of the first tapered portion, as the cross-section of the second fastening portion 22 does not have to correspond in its width to the width of the cross-section of the first fastening portion 8.

The strap is advantageously constructed without any seam. Owing to the lack of a seam along the longitudinal axis of the strap or between the portions, an advantageously secure fixing device, in terms of the production process, can be created, as there is no danger of a seam tearing open. On the one hand, to produce individual straps, in each case the regions of the fastening portions can be cut through, in order thus to obtain a strap with fastening portions located on its front faces. On the other hand, it would also be conceivable to cut through one end of the strap in the region of the fastening portion and the other end in the region of the second portion, the region of the second portion then being fastened to the frame part of the vehicle.

While there has been shown and described an embodiment of the present invention, it will be understood that various changes in the form and details of the device illustrated and in its operation may be made by those skilled in the art without departing from the spirit of the invention. The invention is, therefore, to be limited only as indicated by the scope of the claims appended hereto.

We claim:

1. A strap for securing a side airbag, said strap being connectable at a first end of the strap via a fastening portion of the strap to an airbag and at a second end of the strap via a second portion of the strap to a vehicle part, wherein the fastening portion and the second portion each have constant cross-sections and a tapered portion of the strap is located therebetween, a cross-sectional width of the fastening portion being larger than a cross-sectional width of the second portion and the tapered portion providing a transition therebetween, the strap being constructed from a constant number of individual fibers extending substantially parallel to a longitudinal axis of the strap, the second portion having a hollow cross-section and the fastening portion having a solid cross-section.

2. The strap for securing a side airbag according to claim 1, wherein the second portion has a substantially circular cross-section and the fastening portion has a substantially rectangular cross-section.

3. The strap for securing a side airbag according claim 1, wherein the strap has a length and the tapering portion has a length and the ratio of the length of the strap to the length of the tapering portion is in a range of about 20:1 to about 1000:1.

4. The strap for securing a side airbag according claim 1, wherein the strap has a length and the tapering portion has a length and the ratio of the length of the strap to the length of the tapering portion is in a range of about 30:1 to about 400:1.

5. The strap for securing a side airbag according to claim 1, wherein the strap is free of seams.

6. A strap for securing a side airbag, said strap being connectable at a first end of the strap via a first fastening portion of the strap to an airbag and at a second end of the strap via a second fastening portion of the strap to a vehicle part, wherein a second portion of the strap having two ends is located between the first and second fastening portions and each end of the second portion is connected a fastening portion by a tapered portion that provides a transition therebetween, wherein the fastening portions and the second portion each have constant cross-sections, a cross-sectional width of the fastening portion being larger than a cross-sectional width of the second portion, the strap being constructed from a constant number of individual fibers extending substantially parallel to a longitudinal axis of the strap, the second portion having a hollow cross-section and the fastening portions each having a solid cross-section.

7. The strap for securing a side airbag according to claim 6, wherein the second portion has a substantially circular cross-section and the fastening portions each have a substantially rectangular cross-section.

8. The strap for securing a side airbag according to claim 6, wherein the strap is free of seams.

* * * * *